(12) United States Patent
Shrader (10) Patent No.: US 6,720,979 B1
(45) Date of Patent: Apr. 13, 2004

(54) DYNAMIC MANIPULATION OF ANIMATED GRAPHICS IN A WEB BROWSER

(75) Inventor: Theodore Jack London Shrader, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/353,952

(22) Filed: Jul. 15, 1999

(51) Int. Cl.[7] .............................................. G06T 13/00
(52) U.S. Cl. ...................................... 345/723; 345/473
(58) Field of Search ................................ 345/418, 419, 345/428, 723; 707/501, 513; 717/1

(56) References Cited

U.S. PATENT DOCUMENTS

| | | | |
|---|---|---|---|
| 4,841,291 A | 6/1989 | Swix et al. ................. | 345/473 |
| 4,952,051 A | 8/1990 | Lovell et al. ................. | 352/87 |
| 5,440,677 A | 8/1995 | Case et al. ................ | 707/500.1 |
| 5,537,528 A | 7/1996 | Takahashi et al. .......... | 707/512 |
| 5,664,216 A | 9/1997 | Blumenau ................ | 707/500.1 |
| 5,675,752 A | 10/1997 | Scott et al. ................ | 345/866 |
| 5,856,830 A | 1/1999 | Yamamoto .................. | 345/479 |
| 5,880,743 A | 3/1999 | Moran et al. ................ | 345/473 |
| 5,883,639 A | 3/1999 | Walton et al. ............... | 345/473 |
| 6,167,562 A | * 12/2000 | Kaneko ....................... | 345/425 |
| 6,230,174 B1 | * 5/2001 | Berger et al. ................ | 707/513 |

FOREIGN PATENT DOCUMENTS

WO    9731305    8/1997    ............. G06F/0/00

OTHER PUBLICATIONS

Holzschlag (Web by Design: The complete Guide: Chapter 23–Multimedia Design; 1998).*
Baecker et al ("A Multimedia System for Authoring Motion Pictures": 1996 ACM 0–89791–871–1/96/11).*
"GIF Construction Set" article (PC Magazine, Mar. 4, 1997).*

* cited by examiner

Primary Examiner—Almis R. Jankus (57) ABSTRACT

A client-side mechanism that enables a web browser user to manipulate an animated graphic served from a web server. For example, the mechanism allows the user to view the frames of the animated graphic, to halt the animation on a selected frame, to add a new frame, to delete a frame, to edit/modify a given frame, to alter the sequence of frames, to modify a speed of the animation, or the like In addition, the mechanism enables the user to cache given frames of the animation and to save the changes across browser cache flushes.

29 Claims, 4 Drawing Sheets

DYNAMIC MANIPULATION OF ANIMATED GRAPHICS IN A WEB BROWSER

BACKGROUND OF THE INVENTION

1. Technical Field

The present invention relates generally to web browsing and, in particular, to techniques for enabling a web browser user to manipulate an animated graphic on a web page.

2. Description of the Related Art

The World Wide Web is the Internet's multimedia information retrieval system. In the web environment, a client machine and, in particular, a web browser, effects transactions to web servers using the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL. In response, the client makes a request to the server identified in the link and, in return, receives a document or other object formatted according to HTML. A collection of documents supported on a web server is sometimes referred to as a web site.

HTML authors and web and graphic designers often use non-animated and animated graphics as part of their web pages. A non-animated graphic, for example, is a simple .gif file that displays a static image on the web page when the page is rendered by the browser. An animated graphic comprises a set of static .gif files or that are packaged together and presented to the user in sequential order. A common use of an animated graphic is as a banner advertisement on a web page. With an animated graphic, a set of images is displayed to the user in a rapid manner to catch the user's attention to the banner's content. Each static .gif file of the animated graphic is a "frame" of the animation that is displayed to the user for a given time period. The graphic can also loop back to the first frame for a specified number of rotations, or the animation can run perpetually. The configuration and operation of animated graphics is set forth in the well-known GIF89a standard, which standard is implemented in conventional web browser software (e.g., Netscape Navigator and Microsoft Internet Explorer).

A user of a web browser may desire to manipulate the animated graphic, for example, to freeze the animation on a given frame, to alter the sequence of the frames, or to modify the speed of the animation. Current web browser technology, however, does not provide any mechanism to enable the web browser user to manipulate an animated graphic. The present invention provides a solution to this problem.

BRIEF SUMMARY OF THE INVENTION

The present invention provides a client-side mechanism that enables a web browser user to manipulate a graphic (e.g., an animated GIF) served from a web server. In particular, the mechanism allows the user to view the frames of the animated graphic and to change the behavior of the animation. Thus, for example, the user may halt the animation on a selected frame, edit or modify a given frame, alter the sequence of frames, freeze a frame, modify a speed of the animation, alter the repeat cycle of the animation, add a new frame to the animation, or the like. The changed behavior may then be saved across browser cache flushes so that the new behavior is enforced when the page is later served to the browser.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
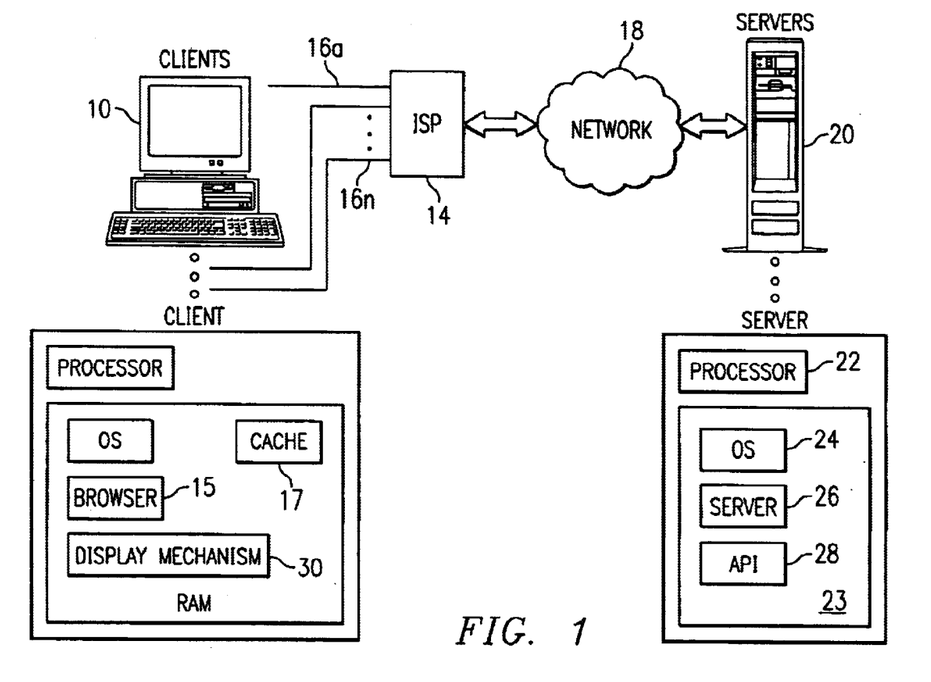
FIG. 1 is a simplified illustration of a client-server environment in which the present invention may be implemented.

A representative system in which the present invention is implemented is illustrated in FIG. 1. A plurality of Internet client machines 10 are connectable to a computer network Internet Service Provider (ISP) 12 via a network such as a dialup telephone network 14. As is well known, the dialup telephone network usually has a given, limited number of connections 16a–16n. ISP 12 interfaces the client machines 10 to the remainder of the network 18, which includes a plurality of web content server machines 20. Network 18 typically includes other servers (not shown) for control of domain name resolution, routing and other control functions. A client machine typically includes a suite of known Internet tools, including a Web browser, to access the servers of the network and thus obtain certain services. These services include one-to-one messaging (e-mail), one-to-many messaging (bulletin board), on-line chat, file transfer and browsing. Various known Internet protocols are used for these services. Thus, for example, browsing is effected using the Hypertext Transfer Protocol (HTTP), which provides users access to multimedia files using Hypertext Markup Language (HTML). The collection of servers that use HTTP comprise the World Wide Web, which is the Internet's multimedia information retrieval system.

A given client machine and the server may communicate over the public Internet, an intranet, or any other computer network. If desired, given communications may take place over a secure connection. Thus, for example, a client may communication with the server using a network security protocol, such as Netscape's Secure Socket Layer (SSL) protocol or the IETF's Transport Layer Security (TLS) protocol.

A representative client is a personal computer, notebook computer, Internet appliance or pervasive computing device (e.g., a PDA or palm computer) that is x86-, PowerPC®- or RISC-based. The client includes an operating system such as Microsoft Windows, Microsoft Windows CE or PalmOS. As noted above, the client includes a suite of Internet tools including a Web browser 15, such as Netscape Navigator or Microsoft Internet Explorer, that has a Java Virtual Machine (JVM) and support for application plug-ins or helper applications. The browser has a cache 17 associated therewith for temporary storage of given content. The browser also includes support for animated graphics per the GIF89a standard.

A representative web server is an IBM Netfinity server comprising a RISC-based processor 22, a UNIX-based operating system 24 and a web server program 26. OS 24 and web server program 26 are supported in system memory 23 (e.g., RAM). The server may include an application programming interface 28 (API) that provides extensions to enable application developers to extend and/or customize the core functionality thereof through software programs including plug-ins, CGI programs, servlets, and the like. The present invention does not require any changes to server-side functionality, however, as will be seen.

The present invention is a graphics control display mechanism 30 that is implemented as a client-side process. In a preferred embodiment, the mechanism 30 is implemented as a computer program, namely, as a set of instructions executed by a processor. Thus, for example, the mechanism may be a Java applet, a browser plug-in, a standalone application written in native code, a distinct process built into the web browser, or part of the integral web browser functionality. Generally, the mechanism allows the user to dynamically manipulate an animated graphic, e.g., to view the frames of the animated graphic, to halt the animation on a selected frame, to edit/modify a given frame, to alter the sequence of frames, to freeze a frame, to modify the speed of the animation, or the like. In addition, the mechanism enables the user to cache given frames of the animation, e.g., in the browser cache.

Figure 2:
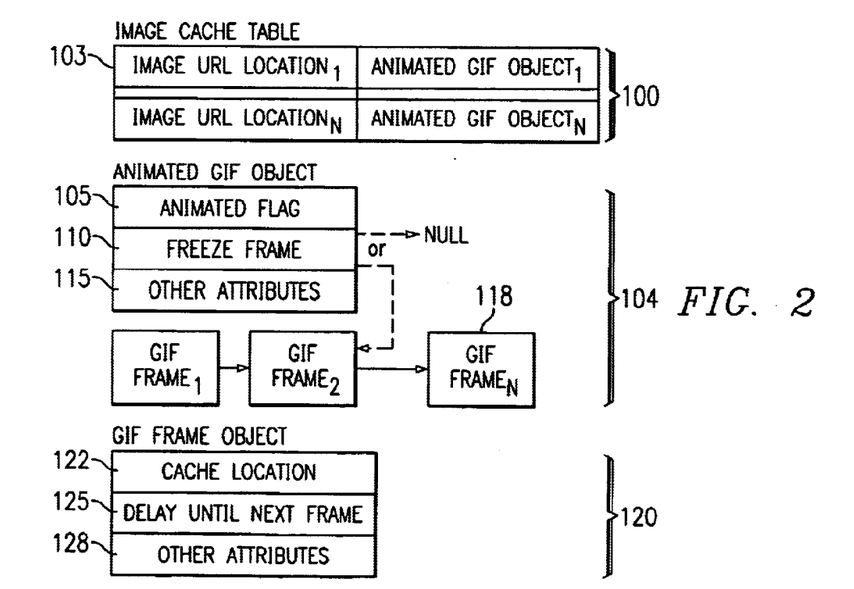
FIG. 2 illustrates representative data structures for use in the present invention.

FIG. 2 shows representative data structures used in the present invention. A first table 100, called ImageCacheTable, stores one to many entries 103. Each entry maps the URL location of an image to an instance of an object, referred to as AnimatedGIFObject. The AnimatedGIFObject 104 is a primary wrapper class to the stored GIF frames that comprise a given animation. The AnimatedGIFObject contains a number of attributes, including the AnimatedFlag 105, a boolean that indicates if the GIF frames should be animated. The FreezeFrame attribute 110 is a pointer to a GIFFrameObject in a GIFFrameList 118 or a null value if the AnimatedGIFObject is not frozen. In an illustrative embodiment, the AnimatedGIFObject is not frozen if the AnimatedFlag attribute is set to true. Other attributes 115 are also represented. The GIFFrameList 118 is a linked list of GIFFrameObjects, with each object representing the individual GIF images that are to be animated. The GIFFrameObject 120 is a class that represents an individual GIF image. The CacheLocation attribute 122 represents the physical location of the GIF image. The DelayUntilNextFrame attribute 125 indicates the time delay that the image should be shown. Other attributes 128 are also represented.

Figure 3:
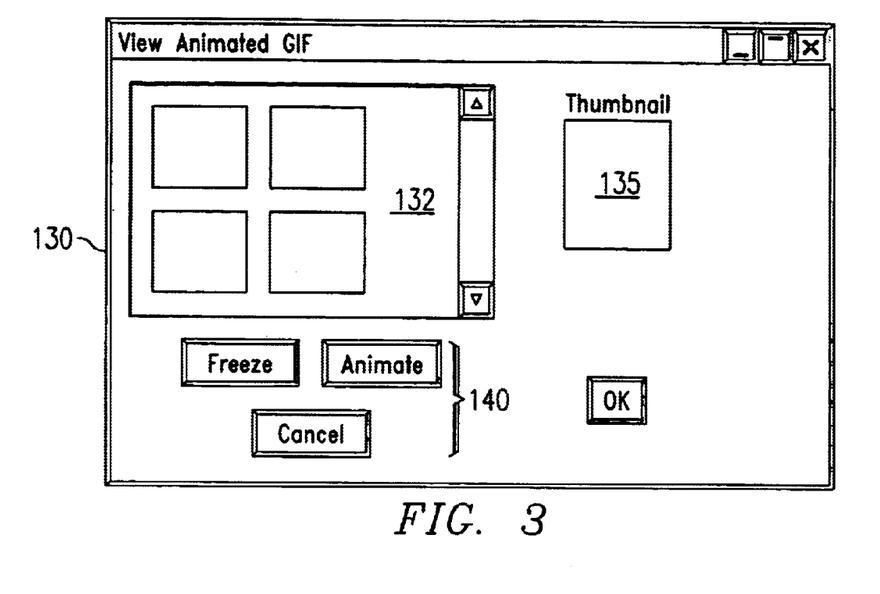
FIG. 3 is an illustrative View Animated GIF dialog according to the present invention.

FIG. 3 is a representative dialog screen according to the present invention. In a preferred embodiment, the user positions a mouse over an animated graphic in a web page and performs a right click operation. Alternatively, a keyboard command may be used. This action generates a View Animated GIF dialog 130 that displays all (or some given number) of the GIF images in the animated GIF in a frames area 132 of the dialog. The dialog may alternatively display a list of the GIF images (identified by URL) instead of the actual images themselves. When the user then selects a given frame, the selected GIF image is shown in a thumbnail area 135. When the dialog appears, preferably the first image in the frames area 132 will be selected and this image will appear in the thumbnail area. Several control buttons 140, Cancel, Freeze or Animate, are available at the bottom of the dialog.

As will be seen, the Freeze button instructs the browser to stop animating frames and to show just a single frame of the animated graphic in the image area of the web browser. The Freeze button does not appear in the dialog if the graphic is already in a frozen state. The Animate button returns a frozen animated graphic to its previous animated state. The Animate button does not appear in the dialog if the graphic was already in the animated state. The Animate button thus "unfreezes" a frozen graphic and allows it to return to its animated state. The Cancel button allows the dialog to disappear without an action being taken.

Figure 4:
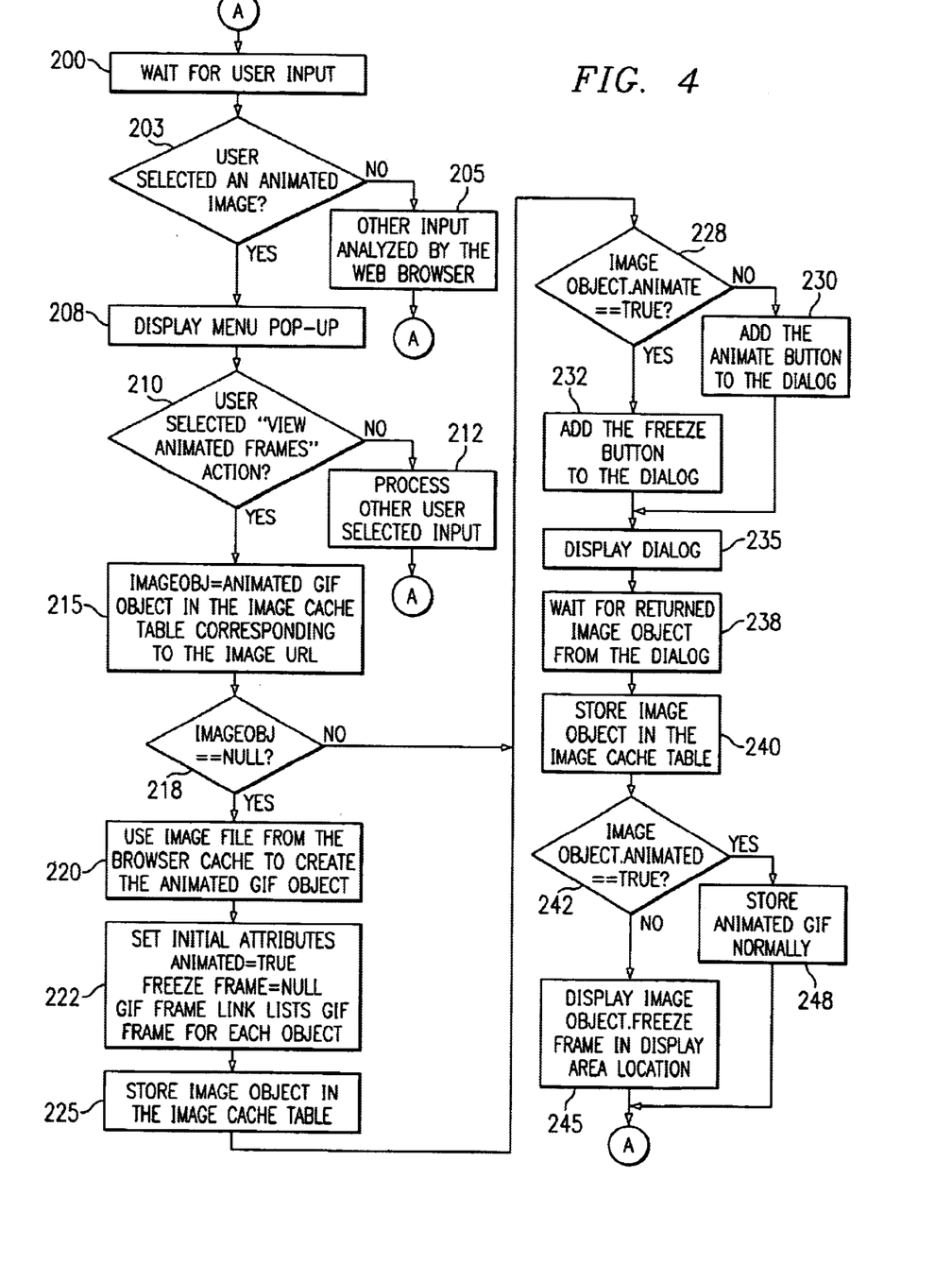
FIG. 4 is a flowchart illustrating a web browser action flow for animated images according to the invention.

FIG. 4 is a flowchart describing a control routine that is used to manipulate animated images according to the present invention. Processing begins at step 200 where the browser waits for user input. Next, at step 203, the browser checks if the user selected an animated image. If not, the user performed some other action, which is handled by the web browser at step 205 before returning to step 200. If, however, the user selected an animated image at step 203, the process flow continues to step 208, where the browser displays a menu popup. Next, the browser checks if the user selected the "View Animated Frames" action from the menu at step 210. If not, the user selected some other action, which is handled by the web browser at step 212 before returning to step 200.

If the user selected the "View Animated Frames" action at step 210, the control flow continues to step 215 where the browser searches the ImageCacheTable to find the entry that has the matching AnimatedGTFObject. If one is found, the ImageObj variable is set to the matching AnimatedGIFObject. If one is not found, the ImageObj variable is set to null.

Processing continues at step 218 where the browser checks if the ImageObj variable is set to null. If not, processing continues at step 228. If the outcome of the test at step 218 is positive, processing continues to step 220 where the browser takes the images file associated with the retrieved URL to create a new AnimatedGIFObject. Next, at step 222, the browser sets the initial attributes of the AnimatedGIFObject: Animated to true and FreezeFrame to null. The browser also creates a linked list of GIFFrameObjects representing the individual GIF images in the animated object and stores the created GIFFrameList with the new AnimatedGIFObject.

Flow continues at step 225 where the ImageObject variable is set to the new AnimatedGIFObject. The AnimatedGIFObject is also stored in the ImageCacheTable with the corresponding URL value where the animated object originated. Flow then continues to step 228 where the browser checks if the Animated attribute for the ImageObject is true. Step 228 is also reached by a negative outcome of the test at step 218. If the outcome of the test at step 228 is negative, the browser adds the Animate button to the View Animated GIF Dialog at step 230 and flow continues at step 235. If the outcome of the test at step 228 is positive, at step 232 the browser adds the Freeze button to the View Animated GIF Dialog and flow continues to step 235.

At step 235, the browser displays attributes of the ImageObject in the View Animated GIF Dialog of FIG. 3. At step 238, the browser waits for the returned ImageObject from the dialog. Next, at step 240, the browser stores the ImageObject in the ImageCacheTable. At step 242, the browser checks if the Animated attribute for the returned ImageObject is true. If so, the browser shows the animated GIF normally in the browser's viewing area at step 248 before returning to step 200. If the outcome of the test at step 242 is negative, the browser shows the GIFFrameObject pointed to by the ImageObject's FreezeFrame value in the browser's viewing area at step 245 before returning to step 200.

Figure 5:
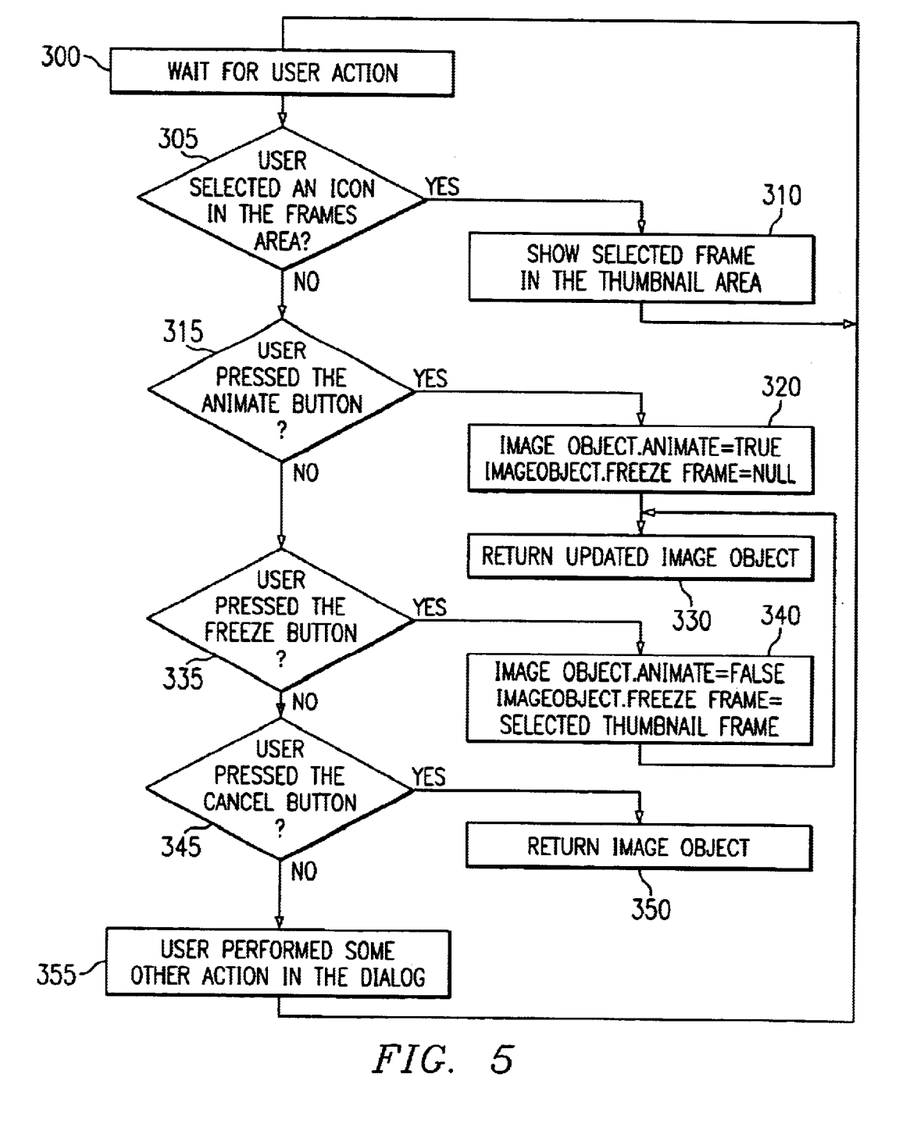
FIG. 5 is a flowchart illustrating how the web browser user may interact with the View Animated GIF dialog according to the present invention.

FIG. 5 shows the action flow of the View Animated GIF dialog illustrated in FIG. 3. Processing begins at step 300 where the dialog waits for user input. Next, the dialog checks if the user selected an icon image in the frames area at step 305. If not, processing continues at step 315. If the outcome of the test at step 305 is positive, processing continues at step 310 where the dialog shows the selected frame in the thumbnail area 132 of the dialog. Processing then returns to step 300.

At step 315, the dialog checks if the user selected the Animate button. If not, processing continues at step 335. If the user selected the Animate button, processing continues at step 320 where the dialog sets the ImageObject Animate value to true and the FreezeFrame value to null. The updated ImageObject is then returned to the user at step 330. At step 335, the dialog checks if the user selected the Freeze button. If not, processing continues at step 345. If the user selected the Freeze button, processing continues at step 340 where the dialog sets the ImageObject Animate value to false and the FreezeFrame value to the selected GIF image, represented by at GIFFrameObject. The updated ImageObject is then returned to the user at step 330. At step 345, the dialog checks if the user selected the Cancel button. If not, processing continues at step 355 where the user performed some other action that the dialog handles before returning to step 300. If the user selected the Cancel button at step 345, the dialog returns the unmodified ImageObject to the caller at step 350. This completes the processing.

The mechanism described above enables a web browser user to manipulate an animated graphic served from a web server. In particular, the mechanism allows the user to right click a given animated graphic and to view the frames thereof. The user may then select a given frame and "freeze" the animation so that only the given frame is displayed on the web page (instead of the animated graphic).

Figure 6:
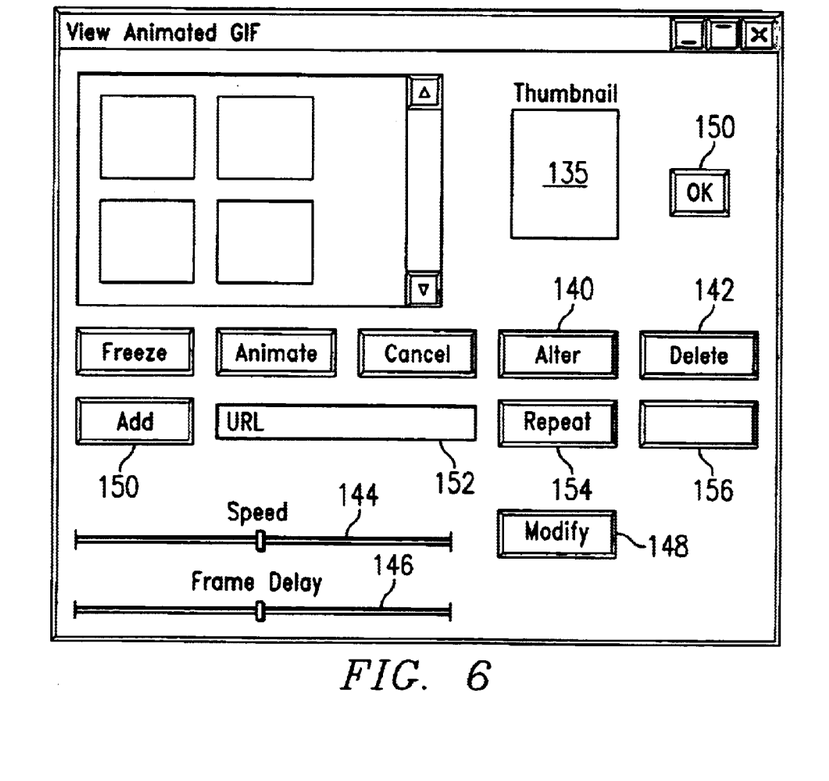
FIG. 6 is an alternative embodiment of the View Animated GIF dialog with additional user controls.

One of ordinary skill will appreciate that the View Animated GIF dialog may include additional controls to enable the web browser user to further manipulate the animated graphic or even given frames thereof. FIG. 6 illustrates some of the these additional controls. Thus, for example, the user may select an Alter button 140 to change the sequence of the frames. Once selected, the user may "drag and drop" given frames to different positions in the dialog to alter the sequence of the animated graphic. Alternatively, the user may select a given frame and select a Delete button 142 to remove the frame from the animation. Yet another alternative is to adjust the speed of the animation using a slider 144. The delay between frames may be adjusted using a slider 146. Selection of the Modify button 148 allows the user to select a given frame and then alter a given characteristic of the frame, e.g., a color characteristic. By selecting an Add Frame button 150, the user may add a frame to the animated graphic by entering the URL for the new frame in field 152. Further, the user may change the repeat cycle of the animated graphic by selecting the Repeat button 154 and entering a new repeat value in the field 156.

After the user performs a given action, he or she selects the OK button 150 in the dialog. This operation closes the dialog and saves the changes to the animated graphic. According to the present invention, preferably the changed behavior is maintained across flushes of the browser cache for the page or for the URL identifying the animated graphic. Thus, upon subsequent presentation of the page, the behavior selected by the user is then presented in the web page instead of the animated graphic.

The present invention provides a client-side mechanism that allows the web browser user to dynamically manipulate a web page graphic. In a preferred embodiment, the mechanism allows the user to right click his or her mouse pointer on an animated graphic and select a "View Animated Frames" action, e.g., from a pop-up menu. This action brings up a dialog box that displays the frames (or, alternatively, a list of the frames) that compose the animation on one side and a thumbnail sketch of a selected frame on an opposite side. When the user selects an entry in the frames list, a small version of the frame's graphic is displayed in the thumbnail area. Using various controls in the dialog as illustrated above, the user may freeze the animation on a given frame, unfreeze the animation, alter the sequence of the animation, add a new frame, delete a given frame, or the like. This dialog affords the user a significant degree of control over how the animated graphic in a web page is displayed on the user's browser.

When the user modifies the behavior of an animated graphic, such as to freeze it on a selected frame, the web browser replaces the cached copy with a new copy of the graphic on the selected frame. The other frames are present, but not animated. Reanimating a frozen graphic involves restoring the image to its previous state by reconfiguring the graphic file or by re-retrieving it from the web site. The web browser preferably includes extensions to its cache database to refer to the frozen graphic instead of the animated one if the page is reloaded and the cache has not been flushed. As noted above, preferably the state of the frozen graphic is maintained across cache flushes.

The present invention thus allows web browser users to control what images they see, such as a particular frame on an animation, without needing to resort to special, external graphic tools. Being able to freeze a frame for current or later browser sessions provides a greater level of control to the user to view information of importance, reducing noise or unwanted information.

As noted above, the inventive mechanism is preferably implemented in or as an adjunct to a web browser. Thus, the invention does not require any modifications to conventional server hardware or software. Although not meant to be limiting, the above-described functionality is preferably implemented as standalone native code or, alternatively, as a Java applet or application. Generalizing, the above-described functionality is implemented in software executable in a processor, namely, as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, as used herein, a Web "client" should be broadly construed to mean any computer or component thereof directly or indirectly connected or connectable in any known or later-developed manner to a computer network, such as the Internet. The term Web "server" should also be broadly construed to mean a computer, computer platform, an adjunct to a computer or platform, or any component thereof. Of course, a "client" should be broadly construed to mean one who requests or gets the file, and "server" is the entity which downloads the file.

Although the present invention has been described in the context of manipulating the behavior of animated graphics (i.e. an animation comprising a set of frames), one of ordinary skill in the art will appreciate that the View Animated GIF dialog may also be used to modify a non-animated graphic or any other type of object reference. Thus, for example, when the user right clicks on a non-animated graphic, the dialog may display just the single frame comprising the object. Using the controls described above, for example, the user may add a new frame to generate an animated graphic. Alternatively, the user may modify the non-animated graphic to alter a given characteristic thereof. Of course, the dialog controls afford the user many different options for modifying the behavior of the object and then saving those changes as has been previously described.

Having thus described my invention, what I claim as new and desire to secure by Letters Patent is set forth in the following claims:

What is claimed is:

1. A method for manipulating an animated graphic for view by a user, comprising the steps of:
   downloading an animated graphic associated with a web page from a network to a user machine, wherein the web page is displayed for a user on the user machine;
   responsive to a selection of the graphic, displaying a dialog identifying a set of frames that comprise the animated graphic; and
   taking a given action with respect to at least one frame in the set of frames to manipulate how the animated graphic is displayed in the page on the user machine as viewed by the user;
   wherein other users see the original behavior of the animated graphic.

2. The method as described in claim 1 wherein the given action selects a given frame to be displayed in place of the animated graphic.

3. The method as described in claim 2 further including the step of displaying a thumbnail view of the given frame in the dialog.

4. The method as described in claim 1 wherein the given action changes a sequence of the set of frames.

5. The method as described in claim 1 wherein the given action deletes a given frame of the animated graphic.

6. The method as described in claim 1 wherein the given action adds a new frame to the animated graphic.

7. The method as described in claim 1 wherein the given action alters a delay between the frames of the animated graphic.

8. The method as described in claim 1 wherein the given action alters a speed of the animated graphic.

9. The method as described in claim 1 wherein the given action alters a given color characteristic of a given frame in the animated graphic.

10. The method as described in claim 1 wherein the given action unfreezes a given frame to restore the animated graphic to an initial state.

11. A method for manipulating an animated graphic in a web page as displayed on a given machine, comprising the steps of:
    responsive to a selection of the animated graphic, displaying a dialog identifying a set of frames that comprise the animated graphic; and
    displaying a thumbnail view of a given frame;
    responsive to user invocation of a freeze function, replacing the animated graphic with the given frame; and
    displaying the web page with the given frame in place of the animated graphic;
    wherein the given frame is automatically displayed in place of the animated graphic when the web page is accessed by the user again from the given machine.

12. The method as described in claim 11 further including the step of invoking an unfreeze function to restore the animated graphic to its original state.

13. The method as described in claim 11 wherein the animated graphic is selected by right clicking a graphic pointer.

14. The method as described in claim 11 wherein the dialog displays the set of frames in a given order.

15. A method for viewing an animated graphic, comprising the steps of:
    downloading an animated graphic associated with a web page from a network to a user machine;
    responsive to a selection of the animated graphic, displaying an option to view a set of frames that comprise the animated graphic;
    responsive to selection of the option, displaying a dialog identifying the frames and including a thumbnail view of a currently selected frame; and
    responsive to changing the currently selected frame, changing the thumbnail view;
    wherein a selected one of the set of frames is displayed in place of the animated graphic on the user machine;
    wherein on subsequent downloads of the web page to the user machine, the selected one of the set of frames is displayed in place of the animated graphic; and
    wherein on subsequent downloads of the web page to machines other than the user machine, the animated graphic is displayed with the web page.

16. The method as described in claim 15, further including the step of:
    responsive to an invocation of a freeze function on a selected frame, replacing the animated graphic with the selected frame in a browser cache; and
    upon subsequent presentation of the web page, presenting the selected frame in the web page rather than the animated graphic.

17. The method as described in claim 15 further including the step of changing a behavior of the animated graphic.

18. The method as described in claim 17 wherein the changed behavior is maintained across cache flushes for the web page.

19. The method as described in claim 15 wherein the network is the Internet and the animated graphic is a GIF.

20. A computer program product in a computer usuable medium for manipulating an animated graphic served in a web page, comprising:

first means responsive to selection of the animated graphic for displaying a dialog identifying a set of frames that comprise the animated graphic together with a thumbnail view of a currently selected frame; and second means responsive to a user taking a given action in the dialog for changing a behavior of the animated graphic as displayed on a user's computer;

wherein a change to the behavior of the animated graphic is only shown when the graphic is displayed on the user's computer; and wherein other users see the original behavior of the animated graphic.

21. The computer program product as described in claim 20 wherein the second means includes means for freezing the animated graphic at a given frame.

22. The computer program product as described in claim 21 wherein the second means includes means for unfreezing the given frame and restoring the animated graphic to its original state.

23. The computer program product as described in claim 20 wherein the second means includes means for altering the speed of the animated graphic.

24. The computer program product as described in claim 20 wherein the second means includes means for altering a delay between a set of frames.

25. The computer program product as described in claim 20 wherein the second means includes means for adding a new frame to the animated graphic.

26. The computer program product as described in claim 20 wherein the second means includes means for deleting a frame from the animated graphic.

27. The computer program product as described in claim 20 wherein the second means includes means for modifying a given frame of the animated graphic.

28. The computer program product as described in claim 20 wherein the second means includes means for altering a sequence of the set of frames.

29. A computer program product in a computer usable medium for manipulating an animated graphic served in a web page, comprising:

first means responsive to selection of the animated graphic for displaying a dialog identifying a set of frames that comprise the animated graphic together with a thumbnail view of a currently selected frame;

second means responsive to a user taking a given action in the dialog for changing a behavior of the animated graphic; and third means for saving the changed behavior in a browser cache.

* * * * *

UNITED STATES PATENT AND TRADEMARK OFFICE
CERTIFICATE OF CORRECTION

PATENT NO. : 6,720,979 B1
APPLICATION NO. : 09/353952
DATED : April 13, 2004
INVENTOR(S) : Shrader It is certified that error appears in the above-identified patent and that said Letters Patent is hereby corrected as shown below:

On Title Page, Item (74)
After Primary Examiner - Almis R. Jankus, insert:
--(74) Attorney, Agent or Firm - Duke W. Yee; Jeffrey S. LaBaw; Patrick C. R. Holmes--

On Title Page Item (57)
(57) Abstract, line 7: after "like" insert --.--.

Signed and Sealed this

Twenty-seventh Day of March, 2007

JON W. DUDAS
*Director of the United States Patent and Trademark Office*